US012760864B2

(12) United States Patent
David et al.

(10) Patent No.: US 12,760,864 B2
(45) Date of Patent: Oct. 13, 2026

(54) FILTER FOR USE WITH LASER-PUMPED LIGHT ENGINE

(71) Applicant: ROBE lighting s.r.o., Roznov pod Radhostem (CZ)

(72) Inventors: Tomas David, Podoli (CZ); Jan Vilem, Valasske Mezirici (CZ); Pavel Juriík, Prostredni Becva (CZ); Josef Valchar, Prostredni Becva (CZ)

(73) Assignee: ROBE lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 19/575,171

(22) Filed: Mar. 23, 2026

(65) Prior Publication Data

US 2026/0218881 A1 Jul. 30, 2026

(51) Int. Cl.
*F21V 9/20* (2018.01)
*F21V 9/32* (2018.01)

(52) U.S. Cl.
CPC . *F21V 9/20* (2018.02); *F21V 9/32* (2018.02)

(58) Field of Classification Search
CPC .................................................. F21V 9/20–45
See application file for complete search history.

(56) References Cited

U.S. PATENT DOCUMENTS 10,133,080 B2 * 11/2018 Jurik .................... G02B 27/141

* cited by examiner

*Primary Examiner* — Jason M Han
(74) *Attorney, Agent, or Firm* — Conley Rose, P.C.; Brooks W Taylor

(57) ABSTRACT

A luminaire including a light engine and a dichroic filter are provided. The light engine emits a light beam including light from a pump laser and light from a phosphor illuminated by the pump laser. The dichroic filter includes a first band pass region having a transmissivity less than 70%, varying by at most +/−10% that extends from a first wavelength shorter than the light from the pump laser to a second wavelength at least 5 nanometers longer than a 50% intensity of a longest wavelength of the light from the pump laser. A band reject region has a second predefined maximum transmissivity less than 10% in a range of longer wavelengths, rejecting at least some shorter wavelengths of the light from the phosphor. A second band pass region has a third predefined maximum transmissivity in a range of still longer wavelengths.

12 Claims, 6 Drawing Sheets

FILTER FOR USE WITH LASER-PUMPED LIGHT ENGINE

TECHNICAL FIELD OF THE DISCLOSURE

The disclosure generally relates to luminaires, and more specifically to a filter for use with a laser-pumped light engine in a luminaire.

BACKGROUND

Luminaires with automated and remotely controllable functionality (which may be referred to as automated luminaires) are well known in the entertainment and architectural lighting markets. Such products are commonly used in theatres, television studios, concerts, theme parks, night clubs, and other venues. A typical automated luminaire provides control from a remote location of the pan and tilt functions of the luminaire allowing an operator to control the direction the luminaire is pointing and thus the position of the light beam on the stage or in the studio. Many automated luminaires additionally or alternatively provide control from the remote location of other parameters such as intensity, focus, zoom, beam size, beam color, and/or beam pattern of light beam(s) emitted from the luminaire.

BRIEF DESCRIPTION OF THE DRAWINGS

For a more complete understanding of this disclosure, reference is now made to the following brief description, taken in conjunction with the accompanying drawings in which like reference numerals indicate like features.

SUMMARY

Figure 1:
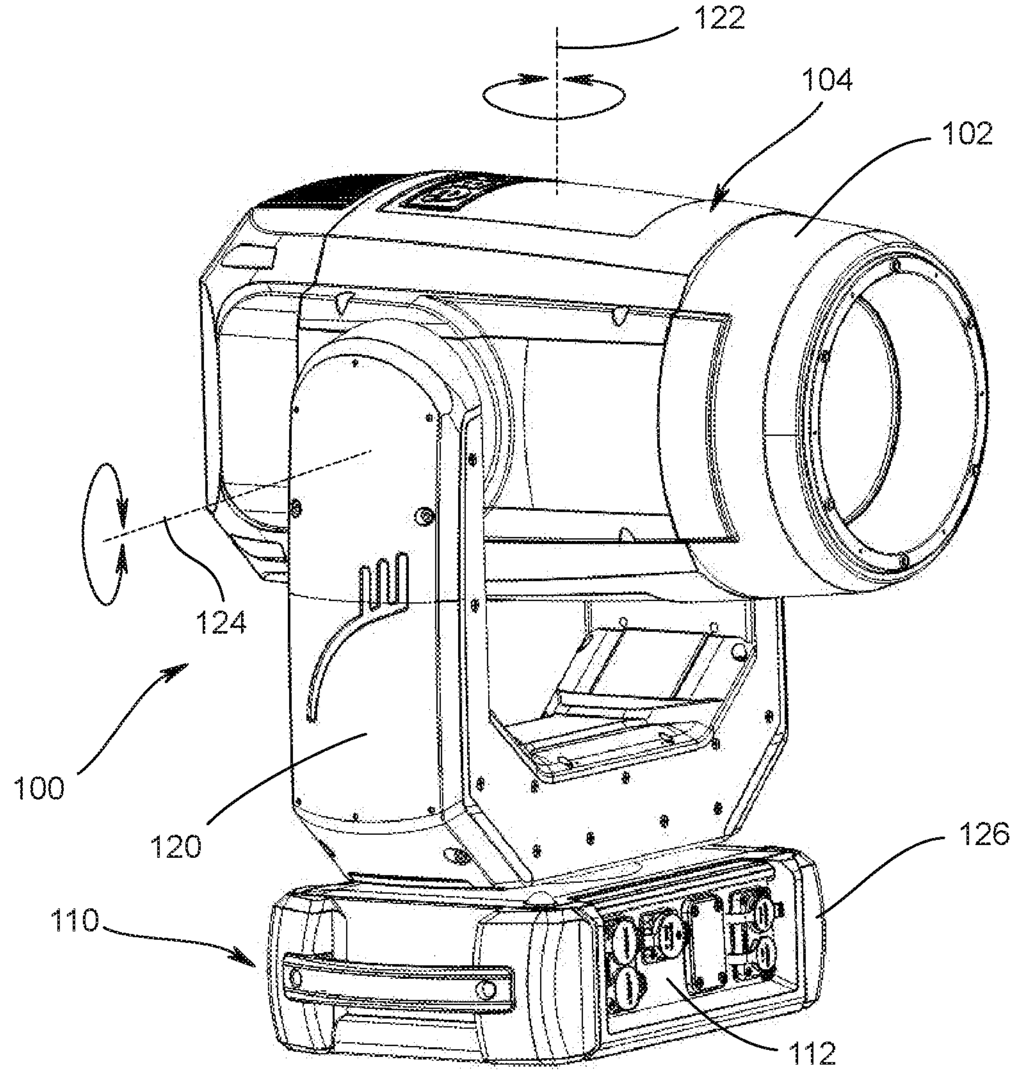
FIG. 1 presents an orthogonal view of a luminaire comprising a filter according to the disclosure for use with a laser-pumped light engine.

In a first embodiment, a dichroic filter is configured for use with a laser-pumped, phosphor-converted light engine producing a light beam, where the light beam includes light from a pump laser and light from a phosphor illuminated by the pump laser. The dichroic filter includes a first band pass region, a band reject region, and a second band pass region. The first band pass region has a first predefined maximum transmissivity that is less than 70% and varies in intensity by no more than +/−10% across the first band pass region, it extends from a first wavelength that is shorter than a shortest wavelength of the light from the pump laser to a second wavelength that is at least 5 nanometers longer than a 50% intensity of a longest wavelength of the light from the pump laser. The band reject region has a second predefined maximum transmissivity of less than 10% across the band reject region, it extends from a wavelength longer than the second wavelength to a predefined third wavelength, and rejects at least some shorter wavelengths of the light from the phosphor. The second band pass region has a third predefined maximum transmissivity and begins at a wavelength longer than the predefined third wavelength.

In a second embodiment, a luminaire includes a light engine and a dichroic filter. The light engine includes a pump laser and a phosphor illuminated by the pump laser and is configured to emit a light beam that includes light from the pump laser and light from the phosphor. The dichroic filter includes a first band pass region, a band reject region, and a second band pass region. The first band pass region has a first predefined maximum transmissivity that is less than 70% and varies by no more than +/−10% across the first band pass region, it extends from a first wavelength that is shorter than a shortest wavelength of the light from the pump laser to a second wavelength that is at least 5 nanometers longer than a 50% intensity of a longest wavelength of the light from the pump laser. The band reject region has a second predefined maximum transmissivity of less than 10% across the band reject region, it extends from a wavelength longer than the second wavelength to a predefined third wavelength, and rejects at least some shorter wavelengths of the light from the phosphor. The second band pass region has a third predefined maximum transmissivity and begins at a wavelength longer than the predefined third wavelength.

DETAILED DESCRIPTION

Preferred embodiments are illustrated in the figures, like numerals being used to refer to like and corresponding parts of the various drawings.

A laser-pumped, phosphor-converted light engine often emits a light beam having a spectrum with a narrow peak of blue light from the pump laser and a wide band of yellow light from the phosphor, which is perceived by the human eye as white light. To produce a desired color, such as magenta, a dichroic filter is used that passes light of blue wavelengths and red wavelengths at desired transmission levels and blocks light between the blue light and the red light (e.g., at green and yellow wavelengths). Such dichroic filters have transition regions between the wavelengths that they pass and the wavelengths that they block, and the transmissivity of the filter in these transition regions may change from high to low over a small range of wavelengths. Some such filters are designed with a blue-green transition region that coincides with the peak of blue light from the laser pump to obtain a desired amount (e.g., 40%) of such blue light in the filtered light emitted from the filter.

Manufacturing variances in fabricating such dichroic filters may result in a first filter having a transition region that differs from a second filter by +/−5-10 nanometers (nm). Similarly, temperature changes of a dichroic filter during operation as an interior of a lighting fixture heats up and cools down may result in operational variances in transition regions of the dichroic filter. In a related issue, manufacturing variances in the pump laser may cause the laser's blue light to be emitted at a slightly longer or shorter wavelength. Individually or in combination, such manufacturing and/or operational variances may result in differences in the amount of blue light from the pump laser in a filtered beam emitted from the filter. Such differences may result in a perceptible difference in the color of a magenta-filtered light beam emitted by a first light engine from that emitted by a second light engine.

In a magenta dichroic filter according to the disclosure, the effect of such manufacturing variances is reduced by designing the filter with a flat (or plateau) region that passes the desired amount of blue light from the pump laser (e.g., 20-35%) and has a transition region at a longer wavelength than the peak of blue light from the pump laser. In this way, the amount of blue pump laser light in the filtered beam is determined by the transmissivity of the plateau region of the filter and the effect is reduced of a shift in the filter's transition region to a longer or shorter wavelength or a shift in the wavelength of the pump laser's blue light. While the dichroic filter according to the disclosure is referred to herein as a magenta filter, such a dichroic filter may also be referred to as a lavender, purple, lilac, bluish-red, or reddish-blue dichroic filter.

FIG. 1 presents an orthogonal view of a luminaire 100 comprising a filter according to the disclosure configured for use with a laser-pumped light engine. The luminaire 100 comprises a head 102 which is configured to rotate within a yoke 120 about a tilt axis 124. The head 102 comprises a housing 104. The yoke 120 is configured to rotate relative to a fixed enclosure 126 about a pan axis 122. The pan axis 122 and the tilt axis 124 are orthogonal to each other. Both pan and tilt motions may be mechanically coupled to hand-operated manual controls or may be coupled for motion to motors, linear actuators, or other electromechanically controlled mechanisms.

A control system 110 (e.g., a microcontroller or other programmable processing system) included in the luminaire 100 may be configured to control electromechanical mechanisms and other components of the luminaire 100. In some embodiments, the control system 110 may communicate with a user and be controlled locally via a user interface 112 included in the luminaire 100. In such embodiments, the control system 110 may display information to the user on a display screen of the user interface 112. Such information may relate to a status of a component of the luminaire 100. In other embodiments, the control system 110 may be in wired or wireless communication via a data link with a remotely located control console that an operator uses to indicate a desired position or other configuration of the head 102. In such embodiments, the operator is able to direct light output from the luminaire 100 in a desired direction, through motion of the head 102 in the pan axis 122 and tilt axis 124.

Figure 2:
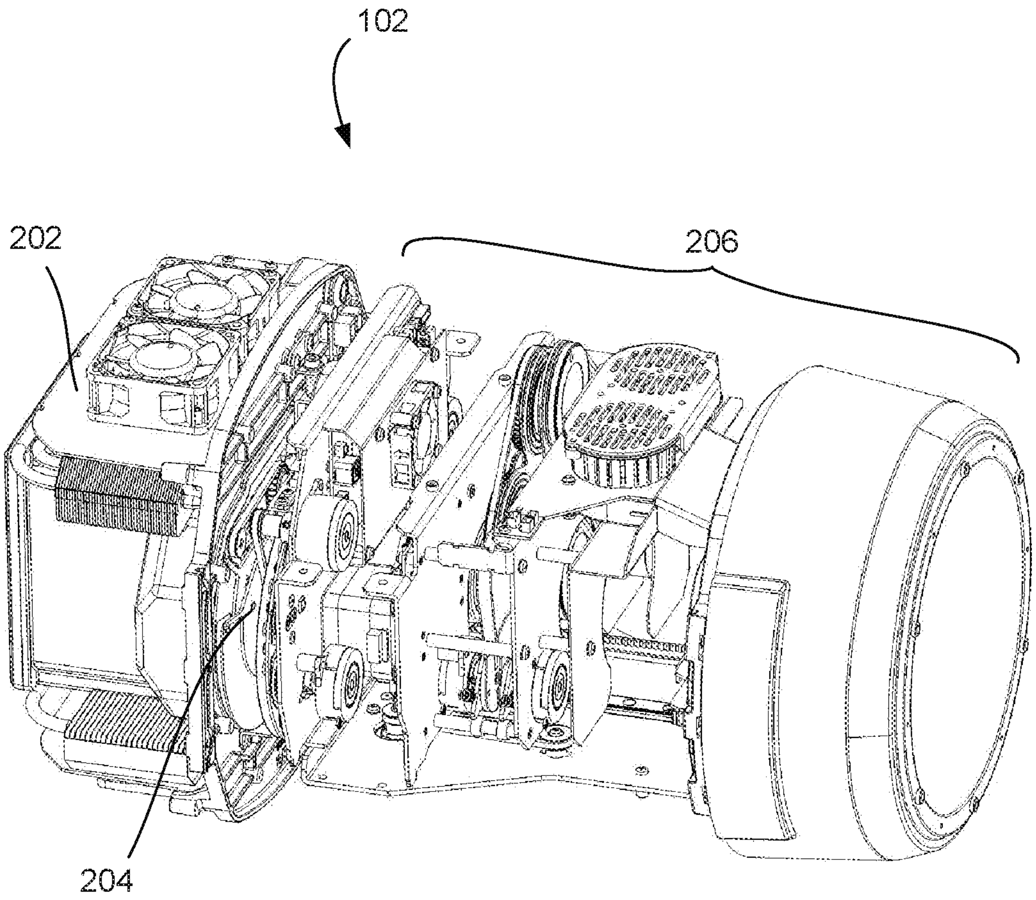
FIG. 2 presents an orthogonal view of the head of the luminaire of FIG. 1 with a housing removed.

FIG. 2 presents an orthogonal view of the head 102 of the luminaire 100 of FIG. 1 with the housing 104 removed. Shown in FIG. 2 are some components of an internal optical system of the head 102. The optical system of the head 102 includes a light engine 202, a color mixing system 204 according to the disclosure, and optical components 206.

Figure 3:
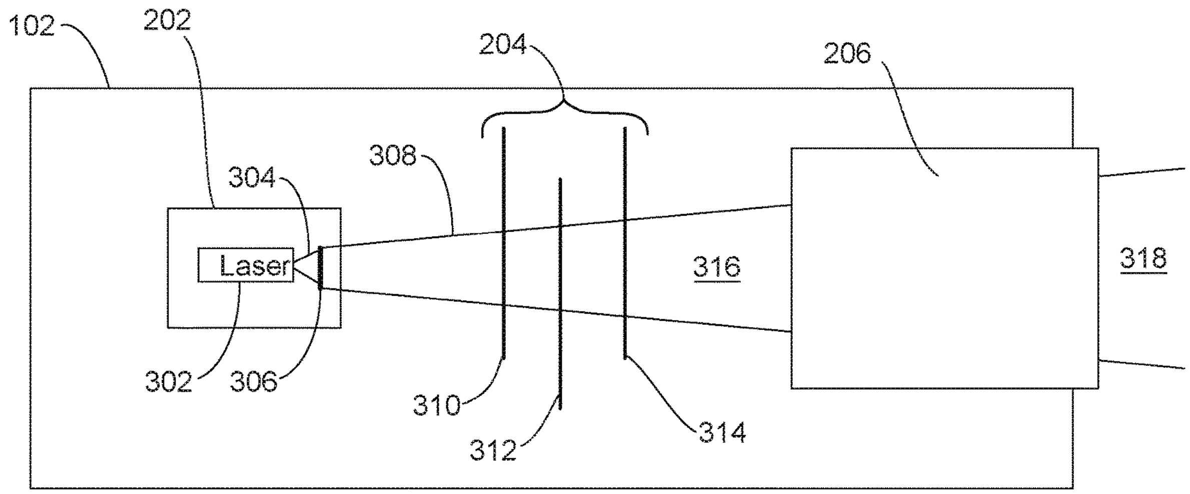
FIG. 3 presents a schematic side view of some components of the internal optical system of the head of FIG. 1.

FIG. 3 presents a schematic side view of some components of the internal optical system of the head 102 of FIG. 1. The light engine 202 comprises a laser-pumped light engine, including a pump laser 302 that emits a beam 304, illuminating a phosphor 306, causing the phosphor 306 to emit a light beam 308. The light beam 308 comprises both light from the pump laser 302 and light from the phosphor 306.

The light beam 308 passes through the color mixing system 204, which includes a magenta color filter 310 according to the disclosure, a yellow color filter 312, and a cyan color filter 314. The color mixing system 204 may additionally or alternatively include a color wheel 315 (shown in FIG. 4A) comprising multiple individual color filters that may be selectively positioned in the beam 308. In some embodiments, the individual color filters of the color wheel 315 are removably attached to the color wheel 315. One or more such individual color filters may comprise a magenta filter according to the disclosure. The color mixing system 204 emits a filtered light beam 316.

The filtered light beam 316 is received by the optical components 206 and is emitted from the head 102 as an output beam 318. The optical components 206 may include one or more components, such as a gobo and/or other pattern generator, a beam size iris, a diffuser, a projection lens, a zoom lens system, or other components that modify the filtered light beam 316 to produce the output beam 318.

The color filters 310, 312, and 314 may comprise dichroic filters that provide a gradient of color filtration, from no filtration, through partial filtration, to full filtration of the light beam 308. In various embodiments, such a gradient may comprise a varying pattern of dichroic filter material supported by a clear substrate. In some embodiments, such a dichroic filter comprises a stochastic or randomized pattern of such filtered and unfiltered regions that extends from a fully filtered region of the filter to a fully unfiltered region of the filter. In other embodiments, such a dichroic filter comprises a pattern of tapering fingers that extends from the fully filtered region to the fully unfiltered region. Where the color filter is a color wheel, the dichroic filter may wrap circumferentially around the wheel in a portion of the wheel through which the light beam 308 passes as the wheel is rotated.

Figure 4A:
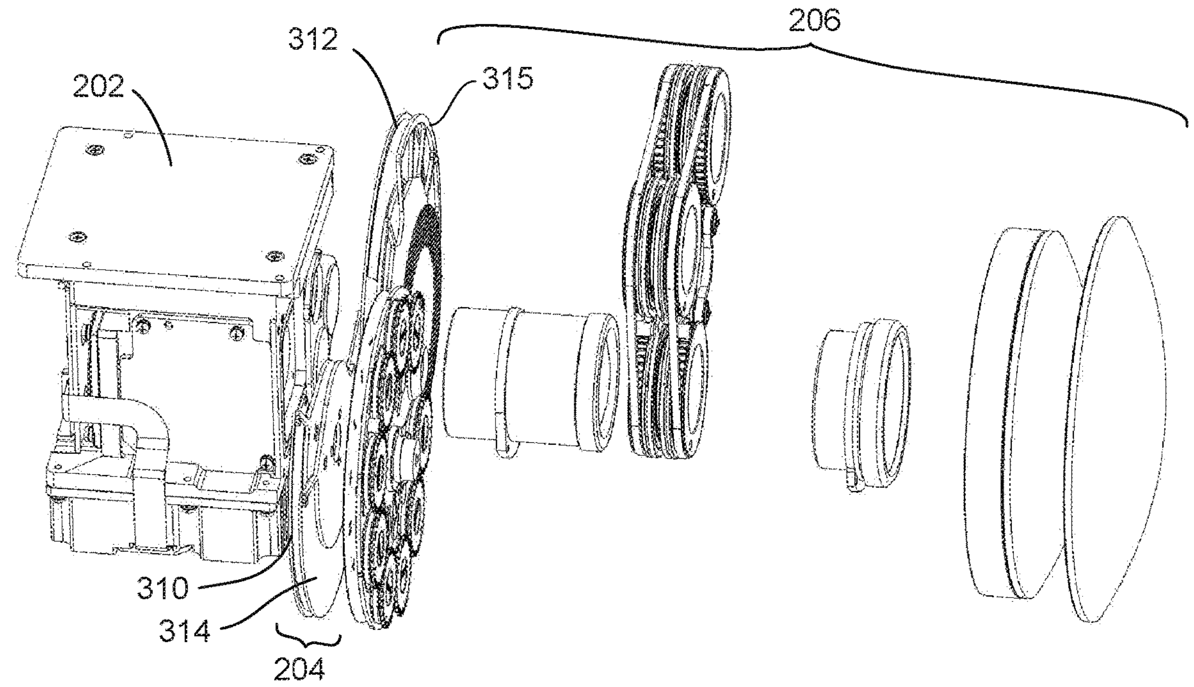
FIG. 4A presents an exploded view of the components of the internal optical system of the head depicted in FIG. 3.
Figure 4B:
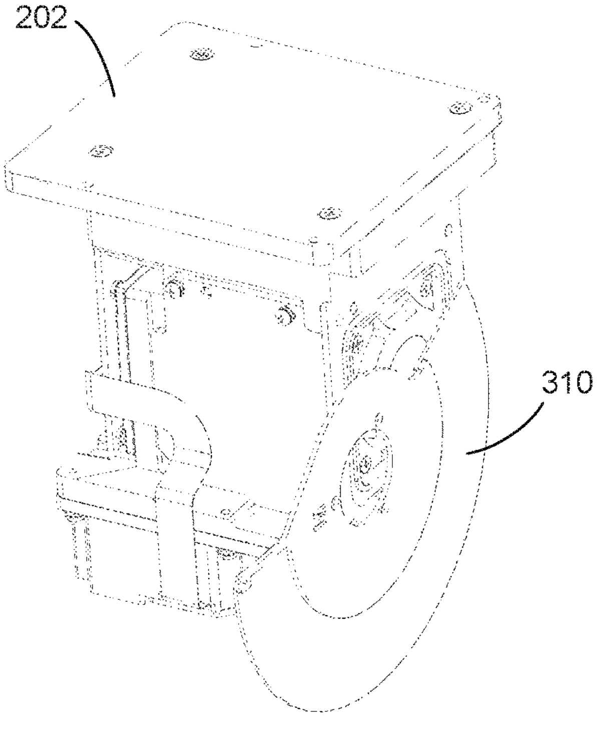
FIG. 4B presents another view of the light engine and the magenta color wheel according to the disclosure of the internal optical system of the head depicted in FIG. 3.

FIG. 4A presents an exploded view of the components of the internal optical system of the head 102 depicted in FIG. 3. The optical components 206 depicted in FIG. 4A are a zoom lens system and a system of selectable, rotatable gobo wheels. While the color filters 310, 312, and 314 are shown as wheels in FIG. 4A, in other color mixing systems, color filters according to the disclosure comprise rectangles or flags with gradated filters that move into and out of the beam 308 in a linear motion. FIG. 4B presents another view of the components of the internal optical system of the head 102 depicted in FIG. 3, showing only the light engine 202 and the magenta color filter 310 according to the disclosure.

Figure 5:
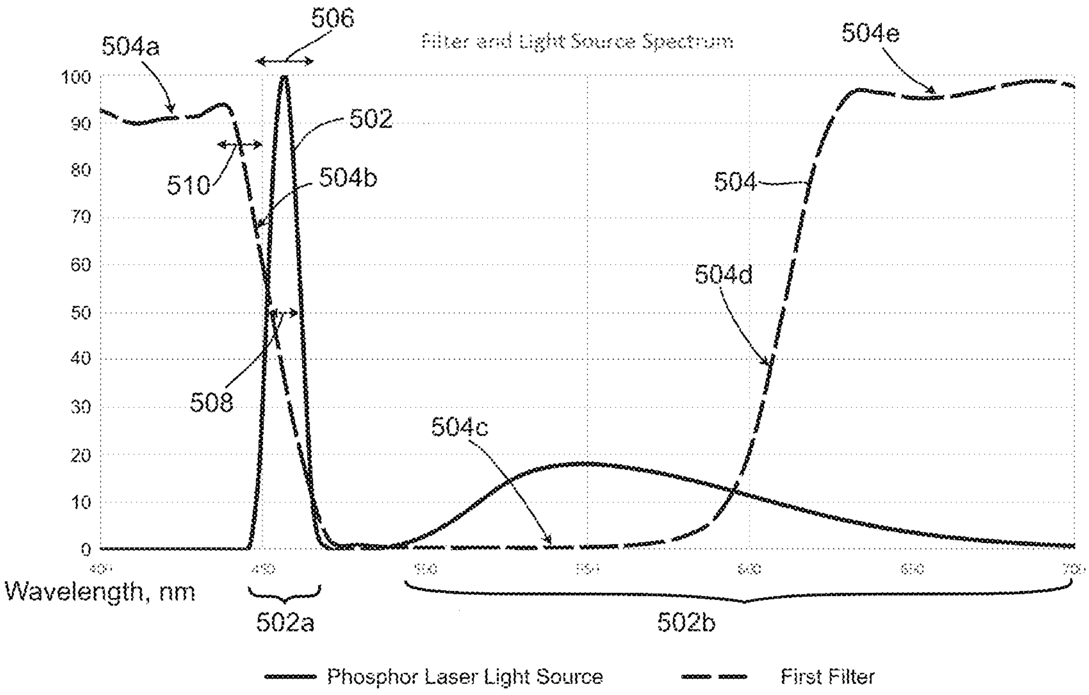
FIG. 5 presents a graph of transmissivity of a magenta dichroic filter and an emission spectrum of a light beam emitted by a laser-pumped light engine.

FIG. 5 presents a graph of transmissivity 504 of a first magenta dichroic filter and an emission spectrum 502 of a light beam emitted by the laser-pumped light engine 202. The vertical axis of FIG. 5 indicates a percentage of the transmissivity 504 of the first magenta dichroic filter and of the intensity of the light beam emitted by the laser-pumped light engine. The first magenta dichroic filter has a short wavelength band pass region 504*a*, a transition region 504*b* to a band reject region 504*c*, and a transition region 504*d* to a long wavelength band pass region 504*e*. The emission spectrum 502 has a short wavelength peak 502*a* and a broader band 502*b* of longer wavelength light with a lower intensity. To the human eye, the combination of the peak 502*a* and the broader band 502*b* is perceived as a bluish (or cool) white color.

Figure 6:
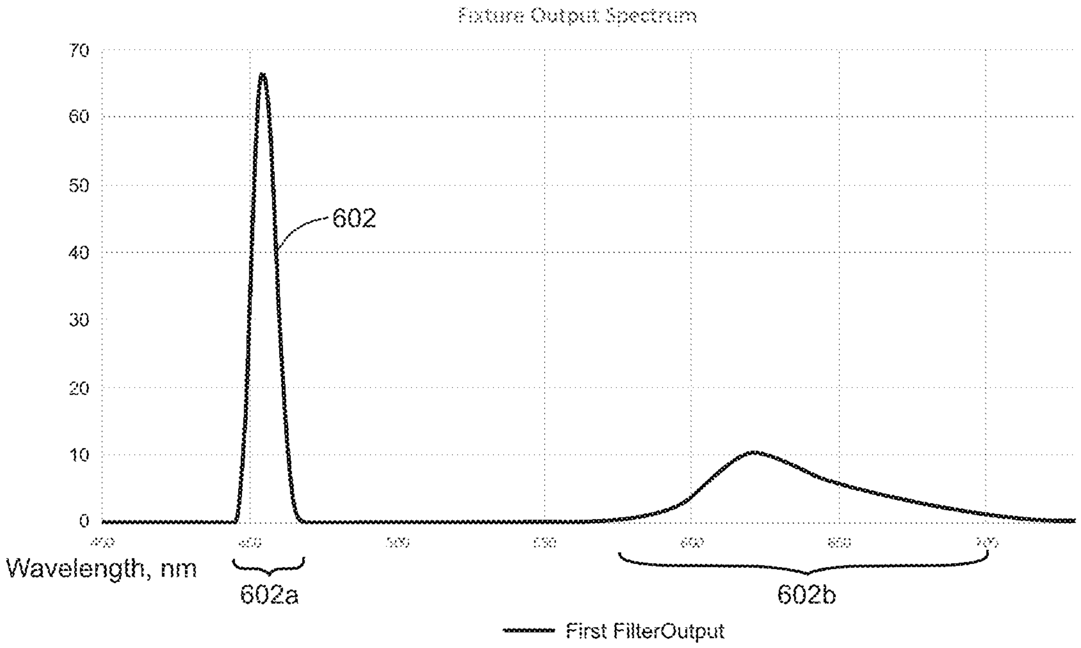
FIG. 6 presents a graph of an emission spectrum of the filtered light beam of FIG. 5.

FIG. 6 presents a graph of an emission spectrum 602 of a first filtered light beam, the filtered light beam of FIG. 5. The vertical axis of FIG. 6 indicates a percentage of an intensity of the first filtered light beam emitted by the first magenta filter. The first filtered light beam has a reduced intensity peak 602*a* with the same center wavelength as the short wavelength peak 502*a* and a narrower band 602*b* spanning a portion of the band 502*b* emitted by the laser-pumped light engine. To the human eye, the combination of the peak 602*a* and the narrower band 602*b* of the first filtered light beam is perceived as a magenta color.

The peak 602*a* has a reduced intensity from the peak 502*a* because the transition region 504*b* crosses the peak 502*a* in a lower transmissivity portion of the transition region 504*b*. A manufacturing variance in fabrication of the first magenta dichroic filter may result in a shift of the transition region 504*b* toward longer or shorter wavelengths, as indicated by arrow 510. Additionally, changes in a temperature of the first magenta dichroic filter may additionally or alternatively cause the transition region 504*b* to shift during operation of the luminaire, as also indicated by the arrow 510. Such shifts may result in changes in the transmissivity of the portion of the transition region 504*b* that crosses the peak 502*a* and, therefore, changes in the intensity of the peak 602*a*, resulting in changes in the intensity combination of the peak 602*a* and the narrower band 602*b*. As a result, manufacturing variances and/or operating temperature variances may cause fixtures with nominally identical laser-pumped light engines and first magenta filters to emit light beams of perceptibly different magenta colors when at the same or different operating temperatures.

In a similar way, manufacturing and/or operating temperature variances may cause the peak 502*a* of the laser-pumped light engine to shift in center wavelength, as indicated by arrow 506 or in a Full Width at Half Maximum (FWHM) width of the peak 502*a*, as indicated by arrow 508. As described for the first magenta filter, these manufacturing variances and/or operating temperature variances in the laser-pumped light engine may also cause fixtures with nominally identical laser-pumped light engines and first magenta filters to emit light beams of perceptibly different magenta colors when at the same or different operating temperatures.

Figure 7:
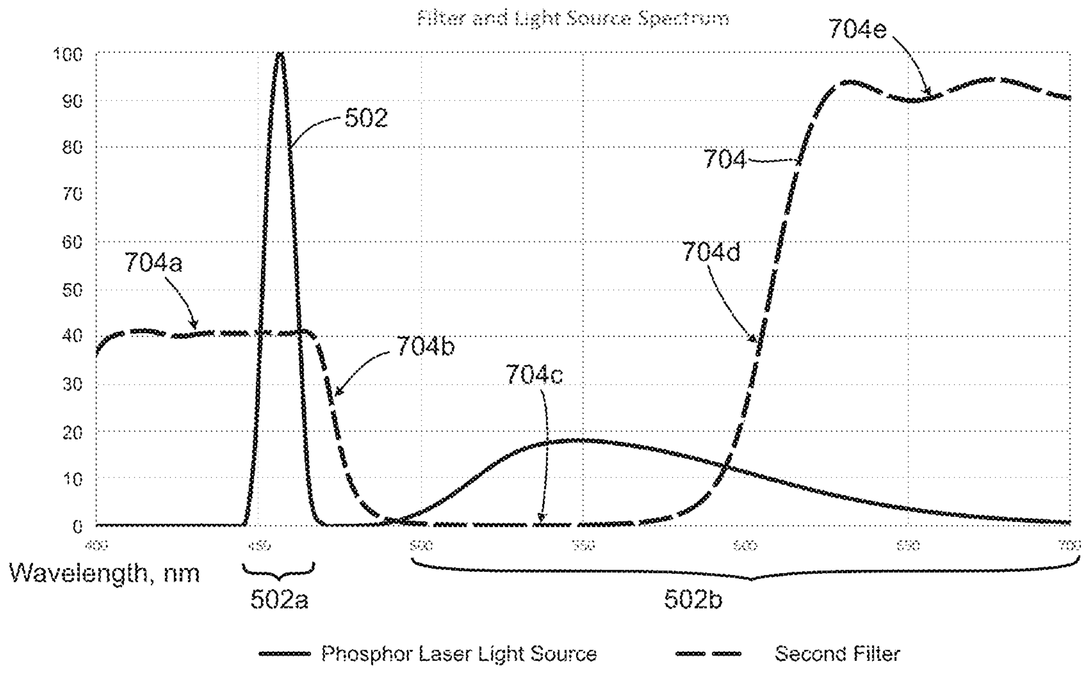
FIG. 7 presents a graph of transmissivity of a second magenta dichroic filter according to the disclosure and the emission spectrum of the light beam emitted by the laser-pumped light engine of FIG. 5.

FIG. 7 presents a graph of transmissivity 704 of a second magenta dichroic filter according to the disclosure and the emission spectrum 502 of the light beam emitted by the laser-pumped light engine of FIG. 5. The vertical axis of FIG. 7 indicates a percentage of the transmissivity 704 of the second magenta dichroic filter according to the disclosure and of the intensity of the light beam emitted by the laser-pumped light engine. The second magenta dichroic filter has a short wavelength band pass region 704*a*, a transition region 704*b* from the band pass region 704*a* to a band reject region 704*c*, and a transition region 704*d* from the band reject region 704*c* to a long wavelength band pass region 704*e*. As described with reference to FIG. 5, the emission spectrum 502 has a short wavelength peak 502*a* and a broader band 502*b* of longer wavelength light with a lower intensity, which is perceived as a bluish (or cool) white color.

The first band pass region 704*a* extends from a first wavelength that is shorter than the shortest wavelength of light of the peak 502*a* to a second wavelength, wherein a 50% point of the transition region 704*b* is at least 10 nanometers longer than a 50% point of a longest wavelength of the peak 502*a*. The first band pass region 704*a* has a predefined maximum transmissivity that is less than 70% and is substantially constant, varying by no more than +/−10% across the first band pass region 704*a*. The band reject region 704*c* has a predefined maximum transmissivity of less than 10% across the band reject region 704*c* and extends from a wavelength longer than the second wavelength to a predefined third wavelength. The band reject region 704*c* rejects at least some shorter wavelengths of the broader band 502*b*. A second band pass region 704*e* has a predefined maximum transmissivity and begins at a wavelength longer than the third wavelength.

Figure 8:
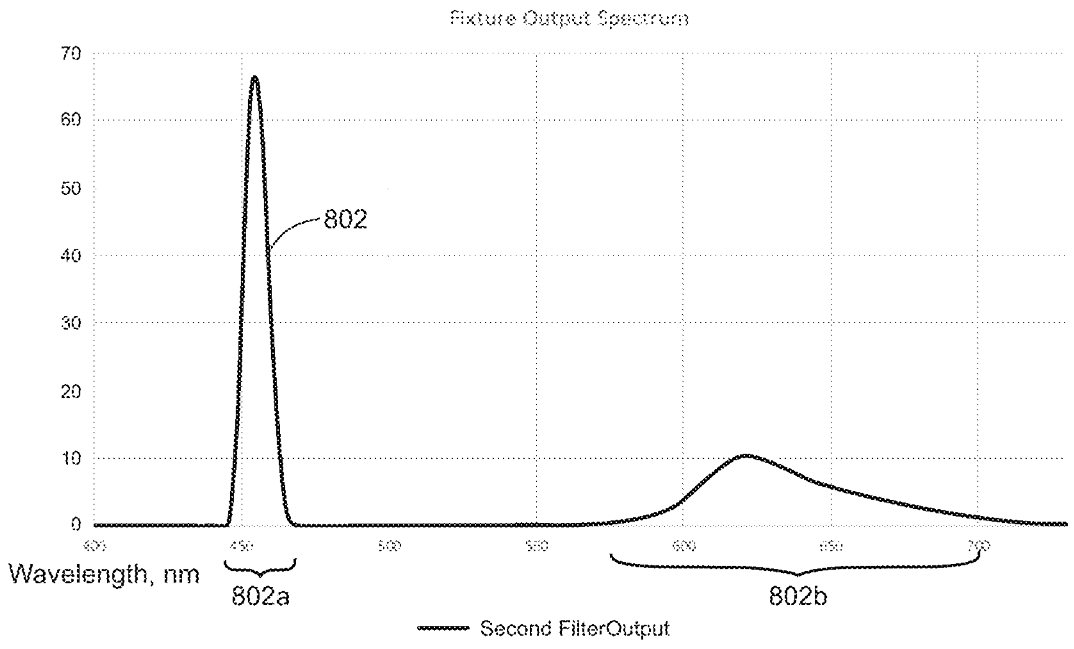
FIG. 8 presents a graph of an emission spectrum of the filtered light beam of FIG. 7.

FIG. 8 presents a graph of an emission spectrum 802 of a second filtered light beam, the filtered light beam of FIG. 7. The vertical axis of FIG. 8 indicates a percentage of an intensity of the second light beam emitted by the second magenta filter. The filtered light beam has a reduced intensity peak 802*a* with the same center wavelength as the short wavelength peak 502*a* and a narrower band 802*b* spanning a portion of the band 502*b* emitted by the laser-pumped light engine. The emission spectrum 802 is the same as the emission spectrum 602 and the combination of the peak 802*a* and the narrower band 802*b* is perceived as the same magenta color as that of the emission spectrum 602.

The peak 802*a* has a reduced intensity from the peak 502*a* because the peak 502*a* is positioned the band pass region 704*a*, at a shorter wavelength than beginning of the transition region 704*b*. The intensity of the peak 802*a* is determined by the transmissivity of the band pass region 704*a*, rather than by the transmissivity of the transition region 704*b* through which the peak 502*a* passes. As a result, a manufacturing variance in fabrication of the second magenta dichroic filter or an operating temperature change in the second magenta dichroic filter that results in a shift of the transition region 704*b* as described above for the transition region 504*b* is less likely to change the intensity of the peak 802*a*. Additionally, the transmissivity of the band pass region 704*a* is susceptible to smaller changes due to manufacturing variances and/or operating temperature variances than the wavelength range of the transition region 704*b*.

Furthermore, shifts in the center wavelength of the peak 502*a* that result from manufacturing variances and/or operating temperature variances of the light engine 202 are less likely to move the peak 502*a* out of the band pass region 704*a* into the transition region 704*b*, causing a change in the intensity of the peak 802*a*. As a result, manufacturing variances and/or operating temperature variances are less likely to cause fixtures having the second magenta filters to emit light beams of perceptibly different magenta colors when at the same or different operating temperatures.

While only some embodiments of the disclosure have been described herein, those skilled in the art, having benefit of this disclosure, will appreciate that other embodiments may be devised which do not depart from the scope of the disclosure herein. While the disclosure has been described in detail, it should be understood that various changes, substitutions, and alterations can be made hereto without departing from the spirit and scope of the disclosure.

What is claimed is:

1. A dichroic filter configured for use with a laser-pumped, phosphor-converted light engine producing a light beam, wherein:

the light beam comprises light from a pump laser and light from a phosphor illuminated by the pump laser;

the dichroic filter comprises:

a first band pass region having a first predefined maximum transmissivity that is less than 70% and varies by no more than +/−10% across the first band pass region, the first band pass region extending from a first wavelength that is shorter than a shortest wavelength of the light from the pump laser to a second wavelength that is at least 5 nanometers longer than a 50% intensity of a longest wavelength of the light from the pump laser;

a band reject region having a second predefined maximum transmissivity of less than 10% across the band reject region, the band reject region extending from a wavelength longer than the second wavelength to a predefined third wavelength, the band reject region rejecting at least some shorter wavelengths of the light from the phosphor; and a second band pass region having a third predefined maximum transmissivity, the second band pass region beginning at a wavelength longer than the predefined third wavelength.

2. The dichroic filter of claim 1, wherein the first predefined maximum transmissivity is 20-35%.

3. The dichroic filter of claim 1, wherein the third predefined maximum transmissivity is 90%.

4. A luminaire, comprising:

a light engine comprising a pump laser and a phosphor illuminated by the pump laser, the light engine configured to emit a light beam comprising light from the pump laser and light from the phosphor; and a dichroic filter configured to receive the light beam emitted from the light engine, the dichroic filter comprising:

a first band pass region having a first predefined maximum transmissivity that is less than 70% and varies by no more than +/−10% across the first band pass region, the first band pass region extending from a first wavelength that is shorter than a shortest wavelength of the light from the pump laser to a second wavelength that is at least 5 nanometers longer than a 50% intensity of a longest wavelength of the light from the pump laser;

a band reject region having a second predefined maximum transmissivity of less than 10% across the band reject region, the band reject region extending from a wavelength longer than the second wavelength to a predefined third wavelength, the band reject region rejecting at least some shorter wavelengths of the light from the phosphor; and a second band pass region having a third predefined maximum transmissivity, the second band pass region beginning at a wavelength longer than the predefined third wavelength.

5. The luminaire of claim 4, further comprising a color mixing system, the color mixing system comprising the dichroic filter.

6. The luminaire of claim 5, wherein the dichroic filter is removably attached to the color mixing system.

7. The luminaire of claim 6, wherein the dichroic filter is removably attached to a wheel comprising multiple individual color filters.

8. The luminaire of claim 5, wherein the dichroic filter provides a gradient of color filtration from no filtration, through partial filtration, to full filtration of the light beam emitted from the light engine.

9. The luminaire of claim 8, wherein the dichroic filter comprises a varying pattern of dichroic filter material supported by a clear substrate.

10. The luminaire of claim 9, wherein the varying pattern comprises (i) a stochastic or randomized pattern of filtered and unfiltered regions or (ii) tapering fingers of filter material.

11. The luminaire of claim 9, wherein the dichroic filter comprises one of a wheel and a flag.

12. The luminaire of claim 11, further comprising a control system configured to control a position in the light beam of the dichroic filter.

* * * * *